March 24, 1970     F. B. HERMITTE ET AL     3,502,541
PLASTIC POLYOLEFIN LAMINATES AND METHOD OF MAKING SAME
Filed April 21, 1966
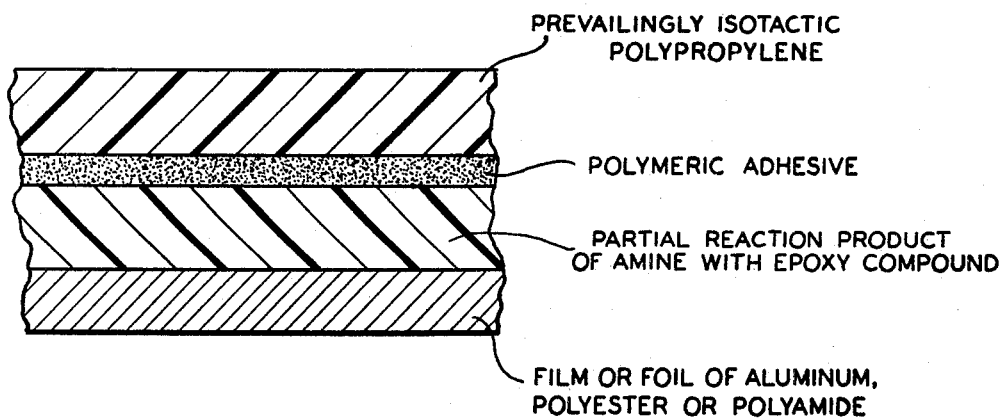
INVENTORS
FRANCO BARBIERI HERMITTE
MARIO ANGELETTI
BY
ATTORNEYS.

3,502,541
PLASTIC POLYOLEFIN LAMINATES AND
METHOD OF MAKING SAME
Franco Barbieri Hermitte and Mario Angeletti, Terni,
Italy, assignors to Montecatini Edison S.p.A., Milan,
Italy, a corporation of Italy
Filed Apr. 21, 1966, Ser. No. 544,110
Claims priority, application Italy, Apr. 27, 1965,
9,497/65
Int. Cl. B32b 27/38, 15/20, 27/32
U.S. Cl. 161—186                    10 Claims

ABSTRACT OF THE DISCLOSURE

Plastic laminates, having high impermeability, strength, transparency and brilliance, particularly useful for packaging, comprising a top layer of a stretched or unstretched polypropylene film, a layer of polymeric adhesive, a layer of the reaction product of an amine with an oxirane compound and a bottom layer of a film or foil of aluminum, a polyester or a polyamide. Methods for preparing the laminates are also disclosed.

---

The present invention relates to the production of laminates of polyolefin films, more particularly of polypropylene films, which laminates can be used for manufacturing containers, envelopes, small bags, vessels and other manufactured articles useful particularly in the packaging industry.

Materials used in the packaging industry must have a variety of desirable mechanical properties, particularly as regards impermeability and thermosealability, etc., besides presenting an esthetically desirable appearance. Generally, films consisting of only one type of polymer do not possess all of the desired properties. Recourse is therefore had to the use of laminates of various films of different substances. The laminates of the present invention have improved impermeability to gases, flavors, fats and moisture and also exhibit very good mechanical characteristics, as well as excellent esthetic characteristics, such as transparency and brilliance. Additionally, the laminates of the present invention can be easily sterilized by heat.

One problem presented by various laminates prepared for packaging of foodstuffs, particularly upon the usual heat sterilization of the packaged product, is a marked tendency of the layers forming the packaging film to delaminate. This phenomenon is particularly evident in the case of laminates consisting of: (a) a film of polypropylene consisting essentially of macromolecules having isotactic structure and prepared with the aid of stereospecific catalysts; (b) a layer of adhesive; and (c) a film or foil of aluminum.

One prior proposal for obtaining polypropylene/aluminum laminates comprises depositing a molten layer of polypropylene over the metal substrate coated with a polyalkylene imine as adhesion promoter or coated with a layer of a polymeric adhesive and then cooling.

Another proposal comprises applying a thermosetting resin such as an epoxide resin to a metal surface such as aluminum, fusing thermoplastic polymer particles to a thermoplastic film and embedding the fused particles in the thermosetting resin.

The figure illustrates the invention as claimed.

We have now found that it is possible to obtain new laminates of polypropylene film with aluminum, a polyester or a polyamide, which laminates do not delaminate even during heat sterilization and have the desired packaging film characteristics mentioned above. The laminates of the present invention are made up of: (a) a polypropylene film either unstretched or stretched in one or two directions; (b) a layer of polymeric adhesive; (c) a layer of a compound obtained by partial reaction of an amine, which amine may or may not be polymeric, with an oxirane derivative (epoxy compound) which may or may not be polymeric; and (d) a film or foil of aluminum or of a polyester or of a polyamide.

The polypropylene films (a) preferably have a thickness of between about 5 and 1000 microns. If desired, they can be subjected to a surface pretreatment with electric discharges or with chemical means in order to increase their receptivity to the adhesive. The electrical treatment of the polypropylene film is carried out by subjecting it to a nondisrupting electric discharge, preferably using discharging devices which are fed with an alternating tension of 200–500 volts and 50–60 Hz. and produce in a discharging space where the film is passed, f.i., between an output electrode and a heated roller (driving the film) a tension of 3,000–10,000 volts at a frequency of 8,000–16,000 Hz. which is capable of generating a sufficient amount of ozone to modify the film surface and render same receptive to inks, adhesives, etc. Devices of this type may be of the SCAE type, particularly the apparatus having a power of 6 kw., fed with a tension of 500 v. at 50 Hz. and giving a discharging current of 0.1 ampere, or of the Lepel Inc. type (particularly the Model HFSG/6). The polypropylene film can also contain opacifiers, stabilizers, lubricants, fillers, organic and inorganic dyeing pigments, antistatic agents and the like.

The adhesive (b), either alone or in admixture with other adhesive, can be applied from solutions or dispersions of the adhesive in water or in an organic solvent or in mixtures of such solvents by methods well known in the art, such as by spreading, immersion and the like. Suitable solvents include hydrocarbons such as ligroin or toluene, esters such as ethyl acetate, ketones such as acetone, methylethylketone, etc. Preferably, solutions having a concentration between 5 and 40% by weight of adhesive are used, whereby to deposit adhesive on the film in amounts of between about 2 and 10 g. per square meter of film.

Suitable adhesives include the synthetic adhesives, e.g., polyvinyl alcohol, thermoplastic resins (for example, cellulose esters and ethers, alkyl and acrylic esters, polyamides, polystyrene, synthetic rubbers, and the like), and thermosetting resins (for example, polyesters, epoxy resins, urea-formaldehyde resins, phenol-formaldehyde resins, melamine-formaldehyde resins, and the like). Particularly preferred are the commercial adhesive "K 29/9 extra" (Wikolin), "Ultraflex 11" (Isaar Chemie), "Cortexin R–66" (Isaar Chemie), "Colla Ep Special" (K. Herberts), "Versamid 125" (General Mills), "Epikote 834 and 820" (Shell) "Bostik 701," "Bostonia 5075 PY and 5076 PY" (B.B. Chemical Co.).

The partial reaction products of layer (c), i.e., the use of amounts of the epoxy compound that are lower than the stoichiometric, include the reaction products of epoxy compounds with alkylenimine polymers, such as polyethylenimine, polypropylenimine, and the like, or with simple amino compounds such as ethylendiamine, diethylene triamine, tetraethylene pentamine, and the like. More specifically are used molar ratios of amine/oxirane compound that are comprised between 1:0.01 and 1:0.99, preferably between 1:0.05 and 1:0.5. The preferred oxirane compounds include polymeric reaction products of epichlorohydrin with bis-phenols (available commercially under the trade name Epikote), or glycidyl derivatives such as the diglycidyl ether of diethyleneglycol, N,N'-diglycidylpiperazine and the like.

The compound of layer (c) may be prepared by mixing diluted aqueous solutions of the amino compound with diluted aqueous solutions or dispersions of the oxirane compound at room temperature. The aqueous solutions thus obtained have a good stability. The coating with the compound of layer (c) can be accomplished by methods known per se, e.g., by spreading onto or by immersing the film in solutions or dispersions of the said compound in water or in organic solvents. The layer (c) is deposited on the support film in amounts preferably between about 0.01 and 0.1 g. per square meter of the support film. If desired, a layer (c) can additionally be applied between polypropylene film (a) and adhesive layer (b).

The layer (d) may be a film or foil of aluminum or of a polyester or of a polyamide. The preferred polyamides are those obtained from ω-amidoundecanoic acid (nylon 11) or from ε-caprolactam (nylon 6) or by polycondensation of hexamethylenediamine with adipic acid (nylon 6.6). Among the polyesters polyethyleneterephthalate is preferred.

The preparation of the laminates of the present invention can be carried out by known methods, e.g., extrusion coating, lamination of two films to each other, and the like.

The laminates of the present invention are particularly useful in the field of food packaging, especially the packaging of foods whose flavor must be preserved, such as coffee, tea, spices and comestible substances of a fatty nature which are deteriorated by atmospheric oxygen. Moreover, they can be used for packaging products under vacuum and preparing packages that can be sterilized by heat.

The laminates of the invention show substantial improvements and advantages as compared to those of the prior art, particularly in that their resistance to delamination after sterilization at 125° C. is higher than 150 g./cm. (peeling test according to ASTM D903-49) whereas the resistence to delamination of laminates of the prior art at best 100 g./cm.

The following examples illustrate the invention without limiting its scope. The preparation of the laminates in the following examples was carried out in a Kampf laminating machine of the Labmaster type.

EXAMPLE 1

An aluminum foil having a thickness of 18 microns was coated on one side (by means of a spreading device of the type gravure roll—see Encyclopedia of Polymer Science and Technology, vol. 3 page 776, 1965—John Wiley & Sons Inc., N.Y.) with a 1% solution, in a 2:1 mixture of methylethylketone and isopropyl alcohol, all parts being by weight, of the reaction product of 15 mols of polyethylenimine and 1 mole of an epoxy resin obtained by polycondensation of epichlorohydrin with di-(p-hydroxyphenyl) dimethylmethane (bisphenol A) having an average molecular weight of 450. The film was then dried in an oven and laminated with a 50μ film of polypropylene having an intrinsic viscosity [η] of 1.8 (determined in tetrahydronaphthalene at 135° C.) which film had been previously coated with a 4μ layer of a commercial polyester adhesive (EPS adhesive of Herberts Co. which is a polyester containing free hydroxy groups crosslinked with a polyisocyanate; or Ultraflex 11 can be used with analogous results). A 72μ composite film was obtained consisting of: (1) the polypropylene film, (2) a first layer of the polyester adhesive, (3) a second layer of the polyimine/epoxy resin reaction product and (4) the aluminum foil.

The laminate obtained showed the following values of resistance to delamination: before sterilization at 125° C., 260 g./cm.; after sterilization at 125° C., 180 g./cm.

EXAMPLE 2

An aluminum foil having a thickness of 18 microns was coated on one side (by means of a spreading device) with a 1% solution, in a 2:1 mixture of methylethylketone and isopropyl alcohol, all parts being by weight, of the reaction product of 5 mols of polyethylenimine and 1 mole of epoxy resin obtained by polycondensation of epichlorohydrin with bis-phenol A having an average molecular weight of 450. The film was then dried in an oven and laminated with a 50μ polypropylene film which had been previously coated with a commercial polyester adhesive (EPS adhesive of the Herberts Co.). A 72μ composite film was obtained consisting of: (1) the polypropylene film, (2) a first layer of the polyester adhesive, (3) a second layer of the polyimine/epoxy resin reaction product and (4) the aluminum foil.

The laminate obtained showed the following values of resistance to delamination: before sterilization at 125° C., 310 g./cm.; after sterilization at 125° C., 230 g./cm.

EXAMPLE 3

A film of polyamide (nylon 11) having a thickness of 40 microns was coated on one side (by means of a spreading device) with a 1% solution, in a 2:1 mixture of methylethylketone and isopropyl alcohol, all parts being by weight, of the reaction product of 5 mols of polyethylenimine and 1 mole of epoxy resin obtained by polycondensation of epichlorohydrin with bis-phenol A having an average molecular weight of 450. The film was then dried in an oven and laminated with a 50μ polypropylene film which had been previously coated with a commercial polyester adhesive (EPS adhesive of the Herberts Co.).

The 94μ laminate obtained showed the following values of resistance to delamination: before sterilization at 125° C., 215 g./cm.; after sterilization at 125° C., 170 g./cm.

Various modifications and changes can, of course, be made without departing from the spirit and scope of the invention.

Having thus described our invention, what we desire to secure by Letters Patent and hereby claim is:

1. A plastic laminate having a resistance to delamination after sterilization of the laminate at 125° C. higher than 150 g./cm., said laminate comprising in consecutive order:
  (a) a film of polypropylene consisting essentially of macromolecules having isotactic structure and prepared with the aid of a stereospecific catalyst;
  (b) a layer of polymeric adhesive;
  (c) a layer comprising a compound obtained by partial reaction of an amine with an epoxy compound;
  (d) a film or foil selected from the group consisting of aluminum, a polyester and a polyamide.

2. The plastic laminate of claim 1 wherein the polypropylene film has a thickness of between 5 and 1,000 microns.

3. The plastic laminate of claim 1 wherein the polypropylene film contains at least one additive selected from the group consisting of stabilizers, lubricants, dyestuffs and antistatic agents.

4. The plastic laminate of claim 1 wherein the polymeric adhesive is selected from the group consisting of cellulose esters, cellulose ethers, polyalkyl esters, acrylic polyamides, polystyrene, synthetic rubbers, polyvinyl alcohol, epoxy resins, urea-formaldehyde resins, phenol-formaldehyde resins and melamine-formaldehyde resins.

5. The plastic laminate of claim 1 wherein the amine is selected from the group consisting of ethylenediamine, dithylenetriamine and tetraethylenepentamine.

6. The plastic laminate of claim 1 wherein the amine is an alkylenimine polymer.

7. The plastic laminate of claim 6 wherein the alkylenimine polymer is polyethylenimine or polypropylenimine.

8. The plastic laminate of claim 1 wherein the epoxy compound is selected from the group consisting of epichlorohydrin/bis-phenol A resins, the diglycidyl ether of diethyleneglycol and N,N'-diglycidylpiperazine.

9. A process for the production of the plastic laminate of claim 1 which process comprises coating a foil of a material selected from the group consisting of aluminum, a polyester and a polyamide with an interlayer consisting of a compound obtained by partial reaction of an amine with an epoxy compound, and thereafter laminating said coated foil with a film of polypropylene consisting essentially of isotactic macromolecules, which film is precoated with an adhesive selected from the group consisting of thermoplastic and thermosetting resins.

10. The process of claim 9, wherein the polypropylene film is stretched in at least one and not more than two directions after it is coated with said adhesive.

References Cited

UNITED STATES PATENTS

| | | | |
|---|---|---|---|
| 2,825,672 | 3/1958 | Koblitz et al. | 161—184 |
| 2,957,794 | 10/1960 | Shetterly et al. | 161—184 X |
| 3,291,775 | 12/1966 | Holm | 161—184 X |
| 3,293,111 | 12/1966 | McCormick | 161—184 |
| 3,306,791 | 2/1967 | Nye | 161—184 X |
| 3,425,886 | 2/1969 | Heins | 161—184 X |
| 3,442,752 | 5/1969 | Sandler et al. | 161—186 |

HAROLD ANSHER, Primary Examiner

U.S. Cl. X.R.

156—330; 161—231, 247

PO-1050
(5/69)

UNITED STATES PATENT OFFICE
CERTIFICATE OF CORRECTION

Patent No. 3,502,541          Dated March 24, 1970

Inventor(s) FRANCO BARBIERI HERMITTE and MARIO ANGELETTI

It is certified that error appears in the above-identified patent and that said Letters Patent are hereby corrected as shown below:

Column 4, line 60, "dithylenetriamine" should read

-- diethylenetriamine --.

SIGNED AND
SEALED

JUL 28 1970

(SEAL)
Attest:

Edward M. Fletcher, Jr.
Attesting Officer

WILLIAM E. SCHUYLER, JR.
Commissioner of Patents